(12) United States Patent
Takahashi et al.

(10) Patent No.: US 10,826,061 B2
(45) Date of Patent: Nov. 3, 2020

(54) METAL-AIR BATTERY AND METHOD FOR REMOVING OXIDE FILM

(71) Applicant: FUJIKURA COMPOSITES INC., Koto-ku, Tokyo (JP)

(72) Inventors: Masaki Takahashi, Saitama (JP); Yuka Amamori, Saitama (JP); Hiroshi Sakama, Saitama (JP)

(73) Assignee: FUJIKURA COMPOSITES INC., Tokyo (JP)

( * ) Notice: Subject to any disclaimer, the term of this patent is extended or adjusted under 35 U.S.C. 154(b) by 0 days.

(21) Appl. No.: 16/649,785

(22) PCT Filed: Sep. 26, 2017

(86) PCT No.: PCT/JP2017/034679
§ 371 (c)(1),
(2) Date: Mar. 23, 2020

(87) PCT Pub. No.: WO2019/064334
PCT Pub. Date: Apr. 4, 2019

(65) Prior Publication Data
US 2020/0280064 A1  Sep. 3, 2020

(51) Int. Cl.
*H01M 4/48* (2010.01)
*H01M 12/06* (2006.01)

(52) U.S. Cl.
CPC ............. *H01M 4/48* (2013.01); *H01M 12/06* (2013.01)

(58) Field of Classification Search
None
See application file for complete search history.

(56) References Cited

U.S. PATENT DOCUMENTS

| 5,316,632 A | 5/1994 | Remppel |
| 2003/0186099 A1 | 10/2003 | Liu et al. |
| 2013/0157148 A1 | 6/2013 | Friesen et al. |

FOREIGN PATENT DOCUMENTS

| JP | 2014-22345 A | 2/2014 |
| JP | 2015-506077 A | 2/2015 |

(Continued)

OTHER PUBLICATIONS

Decision to Grant for JP Application No. 2018-502272 dated Mar. 6, 2018 (2 pages) and English Translation (2 pages).

(Continued)

*Primary Examiner* — Daniel S Gatewood
(74) *Attorney, Agent, or Firm* — McCormick, Paulding & Huber PLLC

(57) ABSTRACT

It is an object to provide a metal-air battery and a method for removing an oxide film that can appropriately remove an oxide film while reducing waste of power required for removing the oxide film. The metal-air battery of the present invention includes a battery main body portion in which a metal electrode and an air electrode are arranged so as to be opposed to each other through an electrolytic solution, a USB terminal to which an external load is connected, and a controller for electrically connecting the battery main body portion and the USB terminal, the controller includes a microcomputer for determining connection or disconnection of an external load to or from the USB terminal, and when the microcomputer confirms the connection of the external load, a current for removing an oxide film is made to flow through a circuit including the metal electrode, the air electrode, and an oxide film removing resistor.

6 Claims, 4 Drawing Sheets

(56) References Cited

FOREIGN PATENT DOCUMENTS

| | | |
|---|---|---|
| JP | 2015-144070 A | 8/2015 |
| JP | 5961315 B | 7/2016 |
| JP | 5961315 B1 * | 8/2016 |
| JP | 5961315 B1 | 8/2016 |
| JP | 2017-107692 A | 6/2017 |
| WO | 2015/045761 A1 | 4/2015 |

OTHER PUBLICATIONS

International Search Report for Application No. PCT/JP2017/034679 dated Oct. 31, 2017.

* cited by examiner

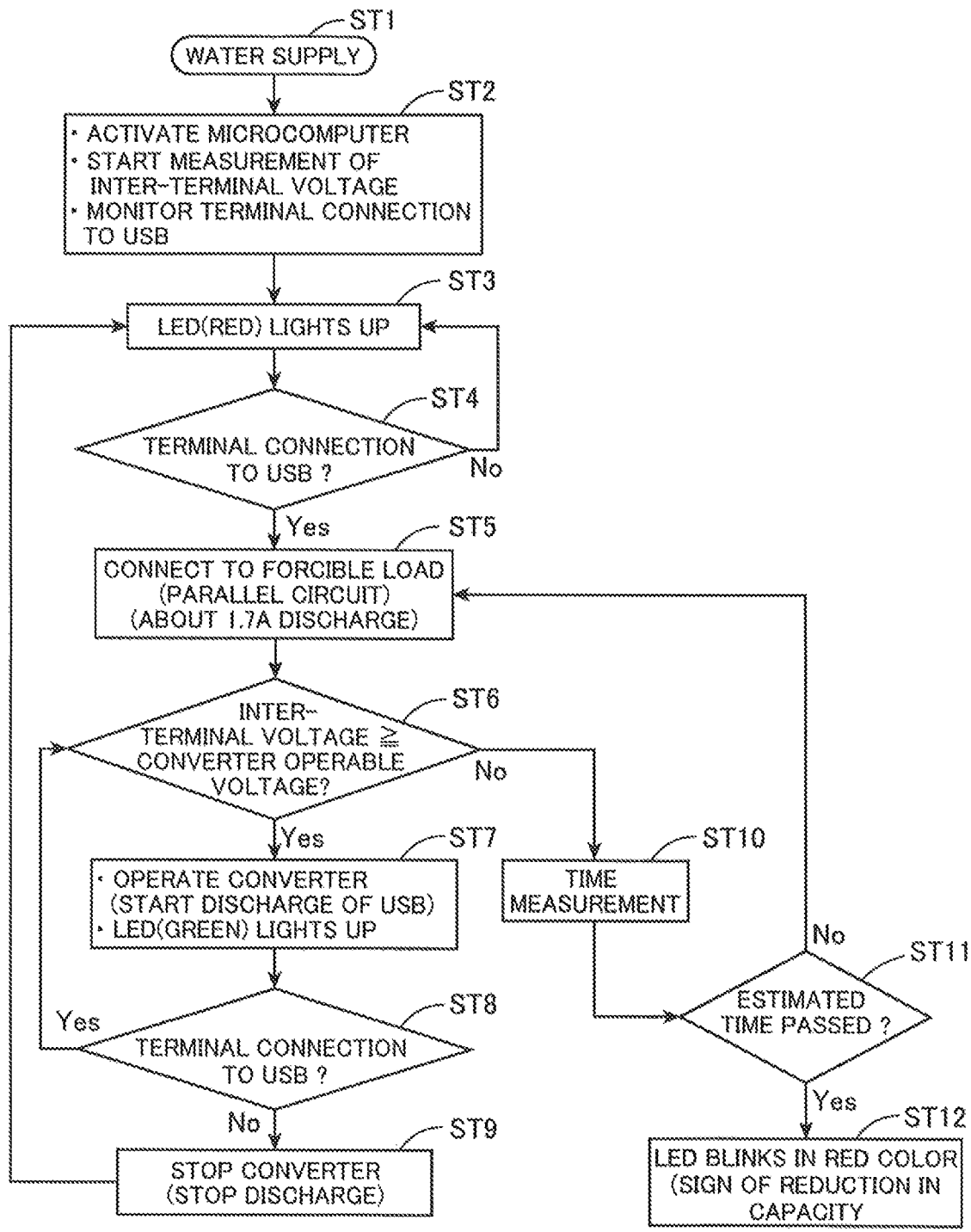

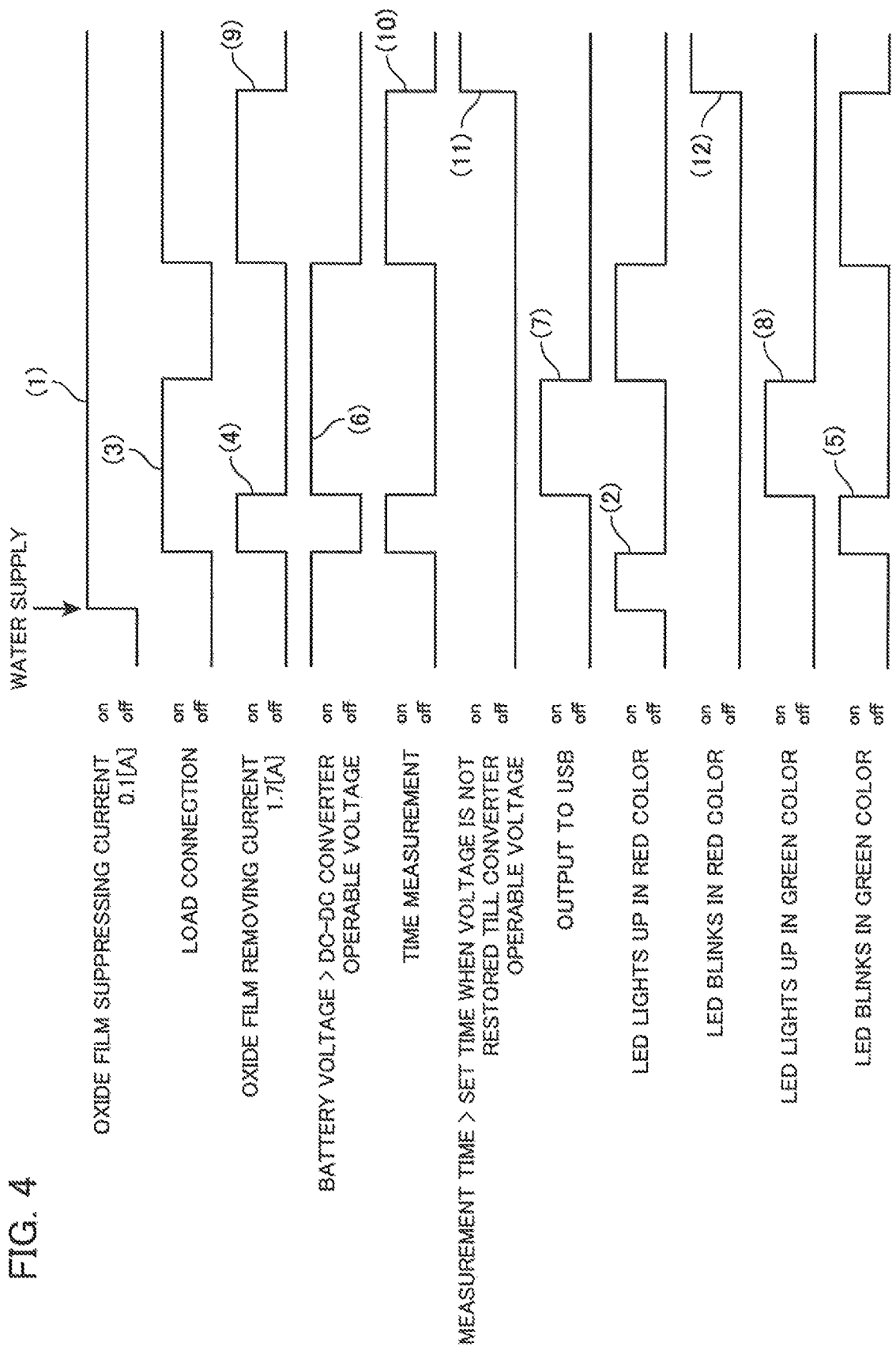

METAL-AIR BATTERY AND METHOD FOR REMOVING OXIDE FILM

CROSS REFERENCE TO RELATED APPLICATION

This application is a National Stage application of International Patent Application No. PCT/JP2017/034679 filed on Sep. 26, 2017, which is hereby incorporated by reference in its entirety.

TECHNICAL FIELD OF THE INVENTION

The present invention relates to a metal-air battery and a method for removing an oxide film.

BACKGROUND OF THE INVENTION

In a metal-air battery, oxygen in the atmosphere is used as a positive electrode active material at an air electrode serving as a positive electrode to perform a redox reaction of the oxygen. On the other hand, a redox reaction of metal is performed at a metal electrode serving as a negative electrode. The energy density of the metal-air battery is high, and thus it is expected to play a role as an emergency power supply or the like in a disaster or the like. Power generation is started by supplying an electrolytic solution to the metal-air battery.

For example, a method capable of removing a passive film (oxide film) formed on a metal film by an oxidation reaction has been proposed for a metal-air battery of Japanese Patent No. 5961315.

SUMMARY OF THE INVENTION

However, in the invention described in Japanese Patent No. 5961315, a current for removing the passive film is forcibly made to flow in a state where no external load is connected to the metal-air battery.

As described above, in Japanese Patent No. 5961315, it is necessary to make the current for removing the passive film flow even in an unused state where no external load is connected to the metal-air battery, so that power is wasted.

Furthermore, in Japanese Patent No. 5961315, when the external load is connected even in a state where the passive film has not been completely removed, supply of the current for removing the passive film is stopped, so that it may be impossible to appropriately remove the passive film.

The present invention has been made in view of such a point, and has an object to provide a metal-air battery from which an oxide film can be appropriately removed while reducing waste of power required for removing the oxide film, and a method for removing the oxide film.

A metal-air battery according to the present invention comprises: a battery main body portion in which a metal electrode and an air electrode are arranged to be opposed to each other through an electrolytic solution; an external connection terminal to which an external load is connected; and a controller for electrically connecting the battery main body portion and the external connection terminal, wherein the controller includes a monitor for determining connection or disconnection of the external load to or from the external connection terminal, and an oxide film removing resistor, and when the connection of the external load is confirmed by the monitor, a current for removing an oxide film is made to flow through a circuit including the metal electrode, the air electrode, and the oxide film removing resistor.

In the present invention, it is preferable that the controller is provided with a power converter for converting power between terminals of the metal electrode and the air electrode, and outputting the converted power to the external connection terminal, and the monitor compares a battery voltage between the terminals with an operable voltage of the power converter, and instructs to supply the current for removing the oxide film to the circuit when the battery voltage is lower than the operable voltage.

In the present invention, it is preferable that the monitor determines that a lifetime of the battery has expired when the battery voltage is lower than the operable voltage although an estimated time has passed.

In the present invention, it is preferable that the controller further includes an oxide film suppressing resistor, and after the electrolytic solution is supplied, a current for suppressing an oxide film is made to flow through a circuit including the metal electrode, the air electrode, and the oxide film suppressing resistor.

In the present invention, it is preferable that the controller is provided with a notification unit for notifying a control status.

According to the present invention, an oxide film removing method used for a metal-air battery for removing an oxide film generated on a metal electrode of a battery main body portion in which the metal electrode and an air electrode are arranged so as to be opposed to each other through an electrolytic solution, comprises: a step of determining whether an external load is connected to an external connection terminal that is electrically connected to the battery main body portion; and a step of causing an oxide film removing resistor to be conducted between terminals of the metal electrode and the air electrode to configure a circuit, and making a current for removing an oxide film flow through the circuit.

According to the metal-air battery of the present invention, after confirming the connection of the external load, a current for removing the oxide film is made to flow, so that it is possible to appropriately remove the oxide film while reducing waste of power required for removing the oxide film.

BRIEF DESCRIPTION OF DRAWINGS

FIG. 3 is a flowchart showing an operation in a controller constituting the metal-air battery of the embodiment.

FIG. 4 is a timing chart of the controller constituting the metal-air battery of the embodiment.

DETAILED DESCRIPTION

Hereinafter, an embodiment of the present invention (hereinafter, abbreviated as "embodiment") will be described in detail. Note that the present invention is not limited to the following embodiment, and can be implemented while variously modified within the scope of the subject matter thereof.

Figure 1:
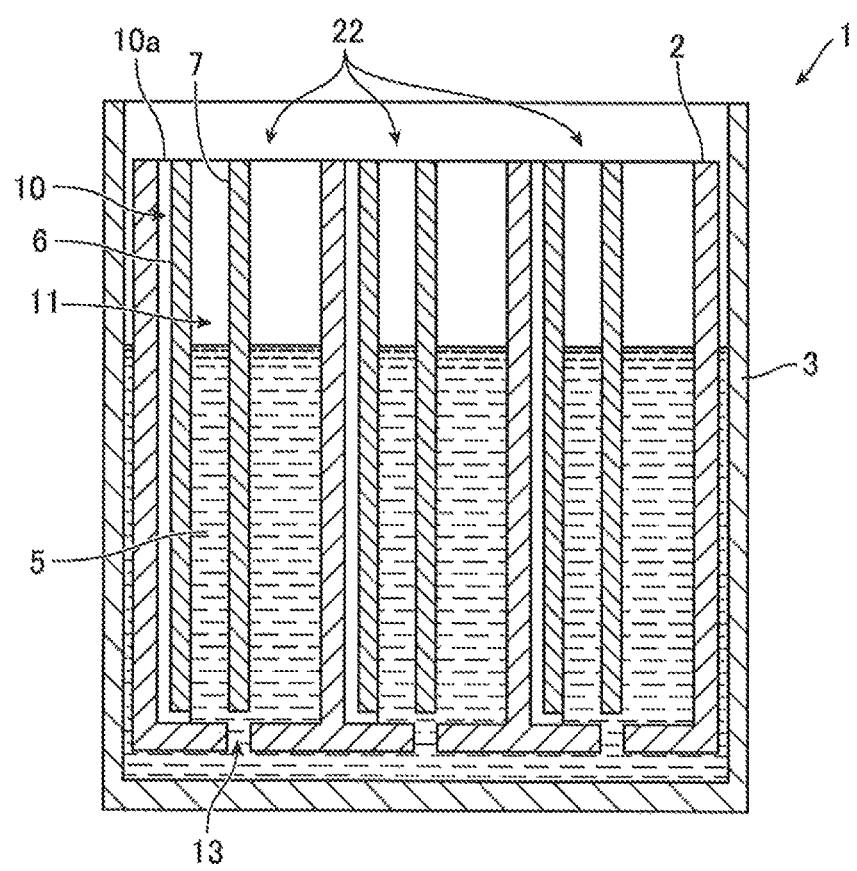
FIG. 1 is a cross-sectional view of a battery main body portion constituting a metal-air battery of an embodiment.

As shown in FIG. 1, a battery main body portion 2 constituting a metal-air battery 1 includes, for example, a plurality of metal-air battery cells 22. In FIG. 1, the number of metal-air battery cells 22 is three, but the number of metal-air battery cells 22 is not limited, and may be one, two, four or more.

Each metal-air battery cell 22 is provided with an air chamber 10 and a liquid chamber 11. The periphery of the air chamber 10 is surrounded, for example, except for an upper portion 10a thereof. Furthermore, the periphery of the liquid chamber 11 is surrounded except for a water supply port 13 thereof. In FIG. 1, the water supply port 13 is provided at a lower portion of the liquid chamber 11. The air chamber 10 and the liquid chamber 11 are isolated from each other, so that an electrolyte injected into the liquid chamber 11 does not leak into the air chamber 10. Note that the structures of the air chamber 10 and the liquid chamber 11 shown in FIG. 1 are examples.

As shown in FIG. 1, each metal-air battery cell 22 is configured to include an air electrode 6 and a metal electrode 7 as electrodes. Each of the air electrode 6 and the metal electrode 7 is supported by a housing constituting the metal-air battery cell 22. As shown in FIG. 1, the air electrode 6 and the metal electrode 7 are arranged to be opposed to each other in the liquid chamber 11. One surface of the air electrode 6 is exposed to the liquid chamber 11, and the other surface of the air electrode 6 is exposed to the air chamber 10. Although the number of the air electrode 6 and the metal electrode 7 is not limited, for example, one metal electrode 7 may be provided for one air electrode 6 or two or more air electrodes 6 and two or more metal electrodes 7 may be provided.

A case 3 shown in FIG. 1 is a container having such a size that the electrolytic solution and the battery main body portion 2 can be accommodated therein. When the metal-air battery 1 is not used, for example, the case 3 shown in FIG. 1 can be covered over the battery main body portion 2.

For example, an electrolytic solution 5 is injected into the case 3 shown in FIG. 1, and the battery main body portion 2 is immersed in the electrolytic solution 5. At this time, the electrolytic solution 5 is guided from the water supply port 13 of each metal-air battery cell 22 into each liquid chamber 11. The electrolytic solution 5 is simultaneously injected into the respective liquid chambers 11 through the water supply ports 13. At this time, the electrolytic solution 5 does not flow into the air chambers 10 as shown in FIG. 1.

As shown in FIG. 1, when the electrolytic solution 5 is supplied to each liquid chamber 11, for example, when the metal electrode 7 is formed of magnesium, an oxidation reaction indicated by the following (1) occurs near the metal electrode 7. Furthermore, a reduction reaction indicated by the following (2) occurs at the air electrode 6. A reaction indicated by the following (3) occurs in the entire magnesium air battery, and discharge occurs.

$$2Mg \rightarrow 2Mg^{2+} + 4e^- \quad (1)$$

$$O_2 + 2H_2O + 4e^- \rightarrow 4OH^- \quad (2)$$

$$2Mg + O_2 + 2H_2O \rightarrow 2Mg(OH)_2 \quad (3)$$

Although not shown in FIG. 1, an external connection terminal for supplying a battery output to the outside and a controller (electric system) for electrically connecting the battery main body portion 2 and an external connection terminal to each other are provided, for example, on the upper surfaces of the metal-air battery cells 22. The external connection terminal is a connector, a USB terminal, or the like, and is not particularly limited. Note that the installation position of the external connection terminal is not limited to a ceiling, and the installation position can be set arbitrarily with respect to the metal-air battery 1.

However, the structure of the metal-air battery 1 shown in FIG. 1 is merely an example, and may be configured so that a water supply port is provided on an upper surface side of the metal-air battery cell 22, and the electrolytic solution 5 is supplied into each metal-air battery cell 22 from the water supply port.

Figure 2:
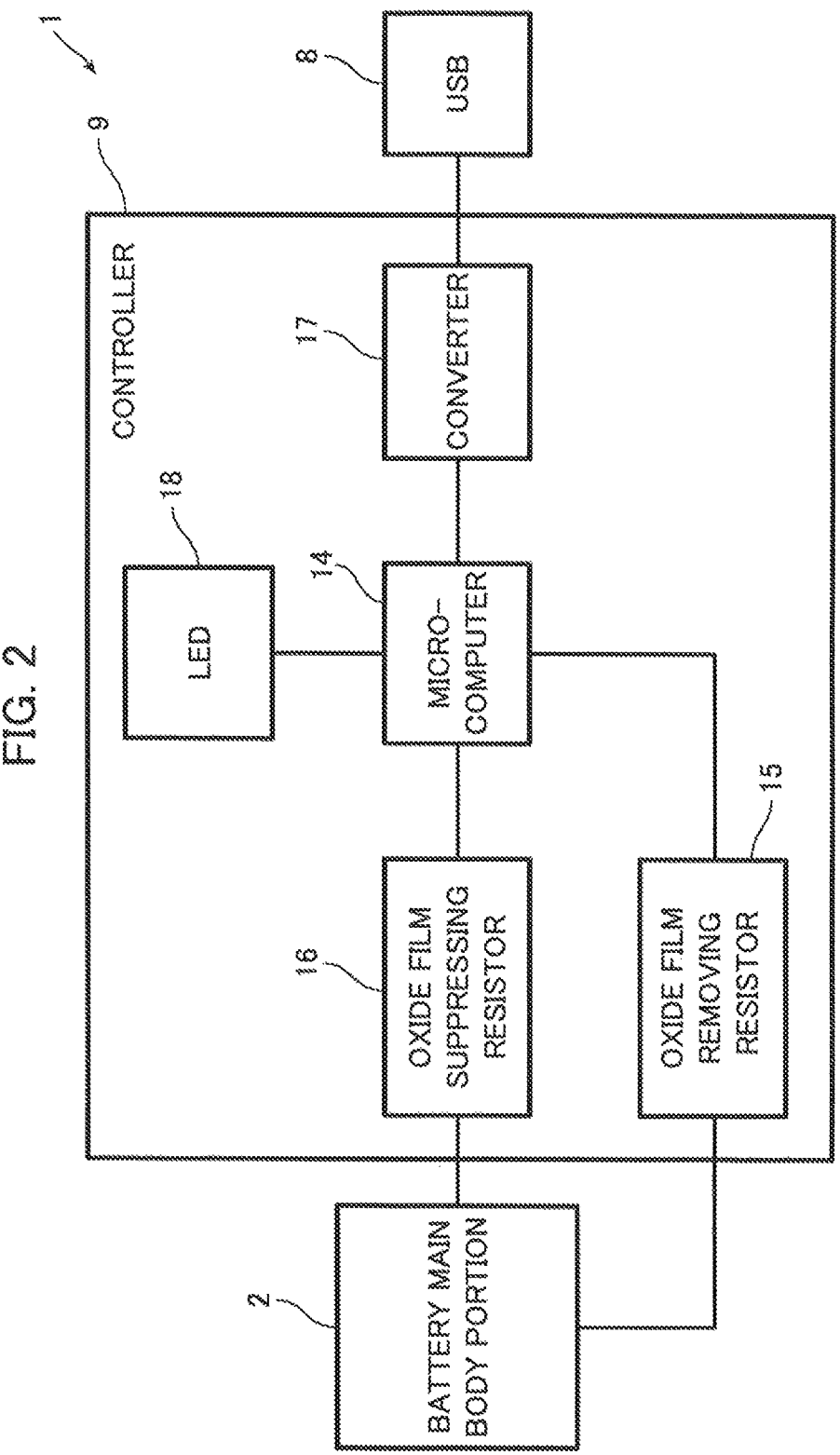
FIG. 2 is a circuit diagram (block diagram) of the metal-air battery of the embodiment.

FIG. 2 is a circuit diagram (block diagram) of the metal-air battery of the present embodiment. As shown in FIG. 2, the metal-air battery 1 is configured to include a battery main body portion 2, a USB terminal 8 as an external connection terminal, and a controller 9.

As shown in FIG. 2, the controller 9 is configured to include a microcomputer 14, an oxide film removing resistor 15, an oxide film suppressing resistor 16, a converter 17 as a power converter, and an LED 18 as a notification unit.

The oxide film removing resistor 15 is provided in the circuit of the controller 9 so as to be electrically conductively connected to the metal electrode 7 and the air electrode 6 of the battery main body portion 2. A switching element (not shown) is provided in a conduction path of the oxide film removing resistor 15. The opening and closing operation of the switching element can be performed by the microcomputer 14. When the switching element is closed, a first closed circuit (discharge circuit) in which the oxide film removing resistor 15 and the metal electrode 7 and the air electrode 6 of the battery main body portion 2 are electrically connected to each other is formed. The first closed circuit is an oxide film removing circuit in which a large current is temporarily supplied. By making the oxide film removal current flow through the first closed circuit, an oxide film formed on the surface of the metal electrode 7 can be dissolved in the electrolytic solution 5, and the oxide film can be appropriately removed.

The oxide film suppressing resistor 16 is always electrically connected to the metal electrode 7 and the air electrode 6 of the battery main body portion 2. Therefore, a second closed circuit (discharge circuit) in which the oxide film suppressing resistor 16 is electrically connected to the metal electrode 7 and the air electrode 6 of the battery main body portion 2 is always formed. The second closed circuit is an oxide film suppressing circuit, and a faint current flows through the second closed circuit. This makes it possible to appropriately suppress an oxide film from being formed on the surface of the metal film.

The converter 17 is a DC-DC converter, and the converter 17 outputs power supplied from the battery main body portion 2 to the USB terminal 8 by conversion of a DC voltage. The converter 17 is driven with a predetermined voltage or more.

Note that the oxide film removing resistor 15 and the oxide film suppressing resistor 16 may be resistance elements or diodes or the like each of which includes a resistance component. The current value can be adjusted by controlling the resistance value. Alternatively, the current value can be controlled by the microcomputer 14.

FIG. 3 is a flowchart showing an operation in the controller constituting the metal-air battery of the present embodiment. FIG. 4 is a timing chart of the controller constituting the metal-air battery of the present embodiment.

As shown in FIG. 3, the electrolytic solution 5 is supplied to the battery main body portion 2 (step ST1). Note that the connection of the USB terminal 8 to the external load such as a portable device may be performed after the supply of the electrolytic solution 5 or before the supply of the electrolytic solution 5.

The microcomputer 14 is activated by supplying the electrolytic solution 5. A voltage (battery voltage) between the terminals of the metal electrode 7 and the air electrode 6 is measured upon activation of the microcomputer 14.

Further, the microcomputer 14 monitors whether an external load such as a portable device is connected to the USB terminal 8. These are performed in step ST2 of FIG. 3.

Here, as shown in "OXIDE FILM SUPPRESSING CURRENT" in FIG. 4, a faint current (0.1 A, for example) is always made to flow in the second closed circuit including the oxide film suppressing resistor 16 shown in FIG. 2 after the supply of the electrolytic solution (see (1) in FIG. 4). Formation of an oxide film on the surface of the metal electrode 7 due to discharge of the closed circuit can be suppressed.

As shown in step ST3 in FIG. 3, after the supply of the electrolytic solution, the LED 18 serving as the notification unit shown in FIG. 2, for example, lights up in red color (see (2) of FIG. 4). As shown in FIG. 2, the LED 18 is electrically connected to the microcomputer 14, and the LED 18, for example, lights up in red color based on a command from the microcomputer 14. The red lighting indicates, for example, a standby state. The standby state indicates a state where the electrolytic solution is supplied and an external load such as a portable device is allowed to be connected to the USB terminal 8. Note that the lighting color may be arbitrarily determined in this step and in subsequent steps, and is not limited.

In step ST4 of FIG. 3, the microcomputer 14 determines whether an external load such as a portable device is connected to the USB terminal 8.

When it is determined in step ST4 of FIG. 3 that the external load is not connected, the processing returns to step ST3, and the LED 18 continues to light up in red color.

When it is determined in step ST4 that the external load is connected, the processing proceeds to step ST5. (3) of FIG. 4 indicates a state where the external load is connected.

In step ST5 in FIG. 3, the oxide film removing resistor 15 shown in FIG. 2 is electrically conductively connected to the metal electrode and the air electrode of the battery main body portion 2 to constitute the first closed circuit, and the oxide film removing current is made to flow through the first closed circuit. As described above, the switching element is provided in the conduction path of the oxide film removing resistor 15, and when the microcomputer 14 determines that the external load is connected, the microcomputer 14 sets the switching element to ON, thereby forming the first closed circuit. The oxide film removing current flowing through the first closed circuit is larger than the oxide film suppressing current.

As shown in the timing chart of FIG. 4, the oxide film removing current is made to flow for a predetermined time (see (4) of FIG. 4). The LED 18 can be made to, for example, blink in green color (see (5) in FIG. 4) while the oxide film removing current is made to flow. The oxide film generated on the surface of the metal electrode 7 can be removed by causing the oxide film removing current to flow for discharging.

Next, in step ST6 of FIG. 3, the inter-terminal voltage (battery voltage) of the battery main body portion and an operable voltage of the converter 17 are compared with each other in the microcomputer 14. When it is determined that the battery voltage is equal to or higher than the operable voltage of the converter 17 (see (6) in FIG. 4), the processing proceeds to step ST7.

In step ST7 in FIG. 3, the converter 17 is operated to output to the USB terminal 8 (see (7) of FIG. 4). At this time, during the output to the USB terminal 8, the LED 18 can be caused to, for example, light up in green color (see (8) in FIG. 4).

As shown in step ST8 of FIG. 3, while the connection of the external load to the USB terminal 8 is continued, it is determined whether the battery voltage is higher than the operable voltage of the converter 17 (step ST6). On the other hand, when it is determined in step ST8 that the external load is unconnected to the USB terminal 8 (that is, when the external load is disconnected from the USB terminal 8), the operation of the converter 17 is stopped (step ST9), and the LED 18 is made to light up in red color (return to step ST3).

Next, when it is determined in step ST6 of FIG. 3 that the battery voltage is lower than the operable voltage of the converter 17, the time (total time) of the oxide film removing current is measured (step ST10). When the measurement time at this time has not reached an estimated time (step ST11), the processing returns to step ST5, and the oxide film removing current is made to flow again.

Unless it is determined in step ST6 that the battery voltage is higher than the operable voltage of the converter 17, the oxide film removing current is made to flow until the measurement time has reached the estimated time in step ST11.

A case where the measurement time has reached the estimated time in step ST11 will be described. When the time of the oxide film removing current indicated by (9) of FIG. 4 (the measurement time indicated by (10) of FIG. 4) has reached the estimated time (that is, the measurement time>the estimated time (see (11) of FIG. 4)), the flow of the oxide film removing current is stopped, and the microcomputer 14 determines that the lifetime of the battery has expired. When it is determined that the lifetime of the battery has expired, the LED 18, for example, blinks in red color as shown in step ST12 in FIG. 3 (see (12) in FIG. 4). This enables a user to know that the lifetime of the battery has expired.

As described above, in the present embodiment, the connection or disconnection of the external load to or from the USB terminal 8 is monitored (step ST4 in FIG. 3). when it is determined that the external load has been connected, in step ST5 of FIG. 3, control is performed so as to make the oxide film removing current flow. In other words, when the external load has been unconnected to the USB terminal 8, no oxide film removing current is made to flow. As described above, the current for removing the oxide film is not made to flow unless the connection of the external load has been confirmed, and no current is made to flow when the external load is unconnected. Therefore, the waste of power to be used for removing the oxide film can be reduced. In addition, when the battery is used while the external load is connected, the oxide film can be appropriately removed, and the battery output can be suppressed from decreasing during use.

In the present embodiment, the microcomputer 14 performs control to compare the battery voltage and the operable voltage of the converter 17 to each other (step ST6 in FIG. 3), and make the oxide film removing current flow again when determining that the battery voltage is lower than the operable voltage of the converter 17 (step ST5 in FIG. 3). As a result, the oxide film can be surely removed by making the oxide film removing current flow until the battery voltage has exceeded the operable voltage of the converter 17, and the converter 17 can be appropriately operated.

Further, when the battery voltage is lower than the operable voltage of the converter although the time has reached the estimated time, the microcomputer 14 can determine that the lifetime of the battery has expired (step ST12 in FIG. 3).

Therefore, the lifetime of the battery can be properly determined without wasting power.

In the present embodiment, the oxide film suppressing current (faint current) can be caused to flow always after the supply of the electrolytic solution 5. As a result, an effect of suppressing the formation of the oxide film can be enhanced.

In the present embodiment, the LED 18 as the notification unit is provided, and it is possible to notify a control status of the battery to a user by means of the color and the lighting mode of the LED 18. The "control status" includes, for example, on standby, during removal of the oxide film, during power supply to the USB terminal 8, expiration of the lifetime of the battery, etc. The notification unit need not be the LED 18, and for example, the status can be notified with a sound, an image or the like.

The metal-air battery 1 shown in FIG. 2 is provided with one USB terminal 8, but a plurality of USB terminals 8 may be provided. In that case, converters 17 are provided according to the number of USB terminals 8. The microcomputer 14 monitors connection or disconnection of an external load to or from each USB terminal 8, and compares the battery voltage with the operable voltage of each converter 17.

The metal-air battery 1 in the present embodiment may be a magnesium-air battery or other metal-air batteries.

According to the metal-air battery of the present invention, the oxide film on the metal electrode surface can be removed appropriately, reduction of battery output can be prevented. The metal-air battery of the present invention is provided with the external connection terminal such as a USB for connecting the external load, and is also applicable to a metal-air battery having any structure or any material as long as the oxide film is easily formed on the metal electrode.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A metal-air battery comprising:
    a battery main body portion in which a metal electrode and an air electrode are arranged to be opposed to each other through an electrolytic solution;
    an external connection terminal to which an external load is connected; and
    a controller for electrically connecting the metal electrode and the air electrode in the battery main body portion with the external connection terminal, wherein the controller includes a monitor for determining connection or disconnection of an external load to or from the external connection terminal, and an oxide film removing resistor, and when the connection of an external load is confirmed by the monitor, a current for removing an oxide film is made to flow through a circuit including the metal electrode, the air electrode, and the oxide film removing resistor.

2. The metal-air battery according to claim 1, wherein the controller is provided with a power converter for converting power between the metal electrode and the air electrode, and outputting the converted power to the external connection terminal, and the monitor compares a battery voltage between the metal electrode and air electrode with an operable voltage of the power converter, and instructs to supply the current for removing the oxide film to the circuit when the battery voltage is lower than the operable voltage.

3. The metal-air battery according to claim 2, wherein the monitor determines that a lifetime of the battery has expired when the battery voltage is lower than the operable voltage although an estimated time has passed.

4. The metal-air battery according to claim 1, wherein the controller further includes an oxide film suppressing resistor, and after the electrolytic solution is supplied, a current for suppressing an oxide film is made to flow through a circuit including the metal electrode, the air electrode, and the oxide film suppressing resistor.

5. The metal-air battery according to claim 1, wherein the controller is provided with a notification unit for notifying a control status.

6. An oxide film removing method used for a metal-air battery for removing an oxide film generated on a metal electrode of a battery main body portion in which the metal electrode and an air electrode are arranged so as to be opposed to each other through an electrolytic solution, comprising the steps of:
    determining whether an external load is connected to an external connection terminal that is electrically connected with the metal electrode and air electrode in the battery main body portion; and
    when it is determined that an external load is connected to the external connection terminal, causing an oxide film removing resistor to be connected between the metal electrode and the air electrode to configure a circuit, and making a current for removing an oxide film flow through the circuit.

\* \* \* \* \*